Sept. 29, 1970     C. C. FAY     3,530,670
PROPORTIONING DEVICE FOR HYDRAULIC SYSTEM ACTUATOR
Filed Sept. 4, 1969     3 Sheets-Sheet 1

INVENTOR
CLARENCE C. FAY

Sept. 29, 1970  C. C. FAY  3,530,670
PROPORTIONING DEVICE FOR HYDRAULIC SYSTEM ACTUATOR
Filed Sept. 4, 1969  3 Sheets-Sheet 2

INVENTOR
CLARENCE C. FAY

Sept. 29, 1970  C. C. FAY  3,530,670
PROPORTIONING DEVICE FOR HYDRAULIC SYSTEM ACTUATOR
Filed Sept. 4, 1969  3 Sheets-Sheet 3

INVENTOR.
CLARENCE C. FAY

McNenny, Farrington, Pearne & Gordon
ATTORNEYS

United States Patent Office 3,530,670
Patented Sept. 29, 1970

3,530,670
PROPORTIONING DEVICE FOR HYDRAULIC SYSTEM ACTUATOR
Clarence C. Fay, 17211 Edgewater Drive, Lakewood, Ohio 44107
Continuation-in-part of application Ser. No. 782,925, Dec. 11, 1968. This application Sept. 4, 1969, Ser. No. 855,349
Int. Cl. F15b 7/08
U.S. Cl. 60—54.6                                    25 Claims

ABSTRACT OF THE DISCLOSURE

There is provided an hydraulic fluid actuator especially useful in automobile dual brake systems characterized by means for dividing an applied force, e.g. from a brake pedal, and directing portions thereof to each of two pistons moving in isolated cylinders, and coacting therewith, means for changing the ratio of forces applied to the pistons in response to movement in said cylinders.

RELATED APPLICATIONS

This application is a continuation-in-part of my copending application Ser. No. 782,925, filed Dec. 11, 1968, now abandoned.

BACKGROUND OF THE INVENTION

This invention realtes, as indicated, to an improved hydraulic brake actuator useful in automobile dual hydraulic subsystem brake systems, and characterized by the desirable ability to effect by very simple means proportionation as between the pressures applied in the respective hydraulic subsystems.

This invention will be described in relation to a dual hydraulic braking system particularly useful in automotive vehicles, etc., it being understood, however, that this invention is applicable in any hydraulically operated mechanism which employs plural hydraulic control systems, e.g. hydraulic earth mover controls.

Safety regulations now in effect require in automotive vehicles that the front and rear brakes be controlled by separate hydraulic subsystems, each subsystem having its own master cylinder, and both being actuated by a single pedal operator. Thus, if failure occurs in one subsystem, the remaining subsystem can be relied upon for control. The master cylinders in such devices are in communication with a fluid reservoir which supplies hydraulic fluid to each of the subsystems. Pistons within the cylinders are driven by a brake pedal and transmit by hydraulic means fluid under pressure sufficient to operate auxiliary brake cylinders located at each wheel to force the brake shoes, or disc calipers, against a rotating drum or a disc, as the case may be. In such hydraulic systems including plural hydraulic subsystems each actuated from a single operator mechanism, it is desirable to provide means for dividing the applied force for application to each separate hydraulic subsystem. The division of forces usually results in different pressures in the respective subsystems, and this means is frequently employed to take into account different braking mechanisms in the same vehicle, for example drum brakes and disc brakes, as well as differences in so-called "cup" sizes, and even to account for different driving conditions. Under certain circumstances, it is desirable to achieve a change in the ratio of the forces applied to the respective subsystems to give an effect now known as "proportionating" which is a way of referring to a change in the ratio of the pressures occurring in the respective hydraulic subsystems during operation.

In my prior U.S. Pat. No. 3,370,426, there has been described a master piston actuator utilizing a force-dividing mechanism in the form of a rocking beam cross member coacting between two piston bodies to divide the force transmitted from an external source of application, e.g. a brake foot pedal. This division of the force may result in forces applied to the pistons which are equal or unequal as may be desired. The device described in that patent enables the predetermination of the relative relationship between the pressure in one hydraulic subsystem and the pressure in the second hydraulic subsystem by adjustment of a fulcrum situated on the rocking beam cross member, and through which the applied force is divided and transmitted. Because adjustment in the fulcrum location is not able to be made during operation, the ratio of pressures in the respective hydraulic subsystems remains substantially constant during the entire stroke.

In accordance with the present invention, which is an improvement upon the invention described in my aforesaid U.S. Pat. No. 3,370,426, means are provided for changing the ratio of pressures in the respective subsystems during movement of the pistons in their respective cylinders.

The aforesaid U.S. Pat. No. 3,370,426 describes an invention which is in turn an improvement on the invention described in my U.S. Pat. No. 3,336,597. Reference may also be had to my U.S. Pat. No. 3,406,522. The present invention may also be applied to the inventions of the foregoing patents. The disclosures of the foregoing patents are hereby incorporated herein in their entirety by reference thereto.

BRIEF SUMMARY OF THE INVENTION

Briefly stated, the present invetnion is in a hydraulic fluid actuator for dual system, hydraulically operated devices, e.g. brakes, comprising in combination a pair of piston bodies movable in separate cylinders in response to an applied force. Means are provided for transmitting force to the pistons to cause movement thereof in their separate cylinders including force-dividing means coacting between the pistons to transmit a portion of the applied force to each of said pistons. Means are provided for changing the ratio of forces applied to the respective pistons which are responsive to movement of the pistons in the cylinders. The principles of the present invention are especially applicable to piston bodies which are in parallel, side-by-side relation.

More specifically, at least one of the two arms of a force-dividing bar or cross member coacting between the pistons and having a fulcrum located intermediate its extremities and separating the arms is provided with means for changing the length of that arm relative to the other arm. These means preferably coact between the cylinder wall and the extremity of the force-dividing bar and are operative during movement of the piston body in response to the applied force. In a specific embodiment, these means comprise a cam and a cam follower. It can be appreciated, therefore, that by utilization of a cam and cam follower means at at least one of the extremities of a force-dividing bar or rocking beam cross member, for example, it is possible to alter the ratio of fluid pressures in the respective hydraulic subsystems in the course of a single stroke in a fluid-pressurizing direction.

BRIEF DESCRIPTION OF THE FIGURES

The invention may be better understood by having reference to the annexed drawings illustrating a preferred and best embodiment of the invention and wherein:

As indicated above, FIG. 1 shows diagrammatically a dual hydraulic braking system generally indicated at 10 for use in an automotive vehicle. One hydraulic subsystem actuates auxiliary wheel cylinders of conventional design located at the front wheels 14 and a separate hydraulic subsystem actuates auxiliary wheel cylinders located at the rear wheel brake assemblies 11. There is provided a master piston actuator body 18 having on one side thereof a master cylinder portion indicated at 15 which communicates by means of hydraulic lines 16 with the auxiliary wheel cylinders in brake assemblies 14 at the front wheels for actuating a braking mechanism of conventional design and of either the drum type or of the disc type, not shown. A separate master cylinder portion 12 communicates by means of hydraulic lines 13 to each of the rear wheel assemblies 11 for actuating conventional auxiliary hydraulic pistons therein. Hydraulic fluid reservoir 17 is conveniently mounted integrally with the cylinder housing, and the entire assembly secured to the fire wall 21. The master piston actuator assembly is driven from a single manually operated foot pedal 20 conventionally mounted within the cab of an automotive vehicle, not shown, connected to and driving a Pitman bar 19 which is removably connected to the master piston actuator. This assembly makes possible easy removal and replacement of the master piston actuator by simply disconnecting hydraulic lines 13 and 16, removing the bolts securing the housing 18 to the fire wall 21, and slidably disconnecting the coupling of the Pitman 19 from the actuator assembly.

FIG. 2 shows in somewhat more detail the environment of the present invention, and illustrates a pair of piston bodies 22 and 24 disposed in side-by-side, parallel relation. The piston body 22 moves through a limited stroke in a cylinder 26, and the piston body 24 moves through a limited stroke in a separate cylinder 28. The force applied to the piston bodies and causing their movement in a fluid-pressurizing direction is derived from a foot pedal 20 acting through a Pitman 19. The foot pedal 20 is coupled to a piston actuator 30 through a coupler 32. A return spring 34 coacts between a Pitman collar 36 and a washer 38 which surrounds an opening in the fire wall 21 to return the brake pedal to its normal position. The piston actuator 30 is provided with a transverse opening 40 adapted to receive a force-dividing bar or rocking beam cross member 42, the details of which are best shown in FIGS. 3, 4 and 5 and wherein the invention of the present application resides. The piston body 22 is provided with a socket 44 which is adapted to receive one end of the rocking beam cross member 42. The piston body 24 is also provided with a socket 46 which is adapted to receive the other end of the rocking beam cross member 42. The sockets 44 and 46 are preferably disposed in opposite, confronting relationship as in the embodiment shown in FIG. 2.

Figure 1:
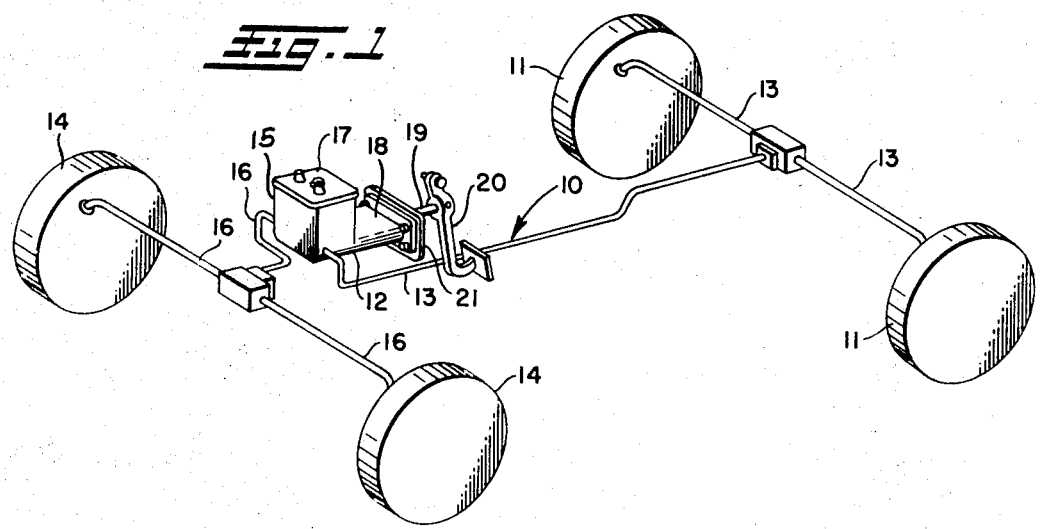
FIG. 1 is a diagrammatic illustration in perspective showing an automotive dual braking system for separately controlling a front wheel brake hydraulic subsystem and a rear wheel brake hydraulic subsystem.
Figure 2:
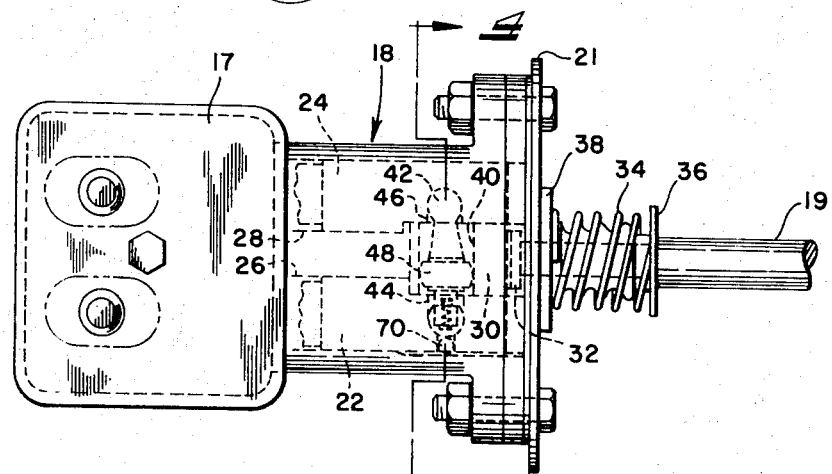
FIG. 2 is a top plan view of a master piston actuator assembly embodying the present invention and showing a portion of a Pitman bar which extends from the brake pedal to the piston actuator.

The longitudinal axis of the piston actuator 30 lies in a plane which is parallel to the axes of the piston bodies 22 and 24 and disposed between such axes, preferably equidistant therefrom. The piston actuator 30 is so constructed and disposed as to permit relative movement of the piston bodies 22 and 24 with respect to it, and to each other in response to the hydraulic pressures in the respective subsystems as described, for example, in my Pat. No. 3,370,426. The rocking beam cross member 42 receives the force transmitted from the brake pedal 20 through Pitman 19 and the coupling 32, and in turn the piston actuator 30 through a fulcrum 48 which is disposed intermediate the extremities of the rocking beam cross member 42. It will be observed from FIG. 2 that the fulcrum 48 is displaced from a central location on the beam 42. In this embodiment, therefore, the rocking beam cross member 42 serves as a force-dividing member to apply unequal components of force to the piston bodies 22 and 24, respectively. If the fulcrum 48 were centrally located, the components of force applied to the piston bodies would be equal. The disposition or location of the fulcrum 48 is a matter of predetermination at the time the master cylinder actuator 18 is assembled, and my prior Pat. 3,370,426 fully describes the structure and the variants thereof.

Figure 3:
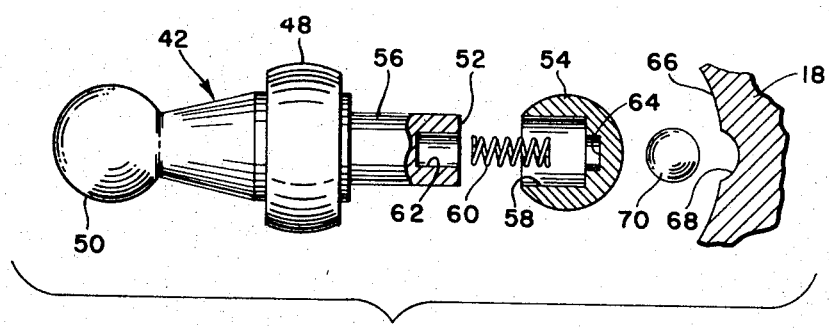
FIG. 3 is an exploded view, partially in cross-section and on an enlarged scale showing a force-dividing bar or rocking beam cross member including a fulcrum disposed intermediate the extremities of the member and defining a pair of moment arms, and also showing the structure of means for changing the ratio of forces transmitted by said force-dividing means.

As best shown in FIG. 3, the rocking beam cross member 42 is desirably a sturdily constructed steel bar. In this embodiment, one end of the bar is fitted with a ball portion 50 which is adapted and dimensioned to form a ball and socket joint with the socket 46 in the piston body 24. This is a preferred joint between the rocking beam cross member 42 and the piston body 24, it being understood that other joints permitting relative pivotal movement between the two parts may be employed.

The opposite extremity 52 of the rocking beam cross member 42 is also provided with a ball portion 54 for similar ball-and-socket joinder with the piston body 22. The ball portion 54 is dimensioned for reception in socket 44 in piston body 22. Instead of being integral with the rocking beam cross member 42 as in my prior Pat. 3,370,426, the ball portion 54 is designed and fitted for telescoping relation with arm 56 of rocking beam cross member 42.

To this end, the ball portion 54 is provided with a recess 58 dimensioned to receive telescopically arm 56. In order to bias the ball portion 54 away from the fulcrum 48, there is provided a small coil spring 60 which is retained in operative position by means of a counterbore 62 in the end of the arm 56, and a counterbore 64 in the ball portion 54. Thus, it will be appreciated that with such structure, the ball portion 54 is telescopically movable on the arm 56 relative to the fixed fulcrum 48. Such movement changes the length of the lever arm through which the force is transmitted to the piston body 22, thereby changing the ratio of the forces applied to piston bodies 22 and 24, respectively, and hence the pressure on the hydraulic fluids in the respective hydraulic subsystems. The shorter the arm through which the force is transmitted, the greater the force applied to the piston body.

As indicated above, the adjustment in the ratio of applied forces through the force-dividing bar 42 or rocking beam cross member 42 occurs during the piston stroke, e.g. when the brakes are applied by the operator. To effect the change in the ratio, means are provided to change the length of the arm through which the force is transmitted. In the embodiment shown, a cam and cam follower are provided coacting between the cylinder wall and the movable ball portion 54. As shown in FIG. 3, there is provided a camming groove 68 in cylinder wall 66 contained in master piston actuator body 18, and a cam follower 70 in the form of a small steel ball adapted and dimensioned for movement in groove 68.

Figure 4:
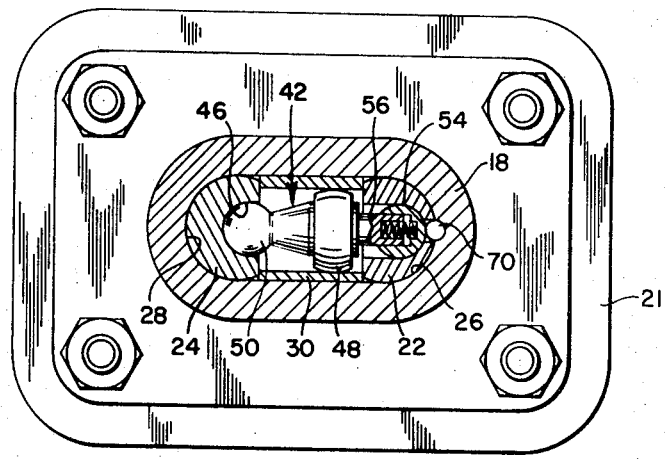
FIG. 4 is a cross-sectional view of the apparatus shown in FIG. 2 as it appears in the plane indicated by the line 4—4.
Figure 5:
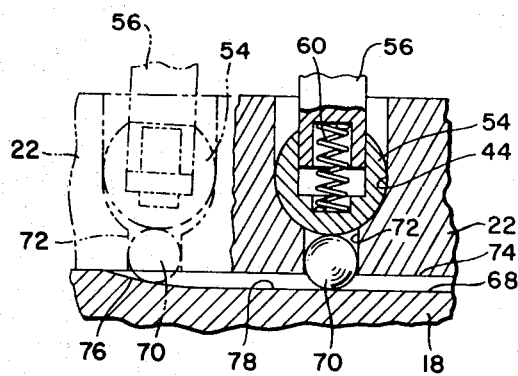
FIG. 5 is a partial cross-sectional view on an enlarged scale showing the profile of a cam groove in the sidewall of the cylinder and a cam follower at two positions in the stroke of a piston body and illustrating a shortening of the distance between the fulcrum and the point of application of the force portion to the piston body.

As best shown in FIGS. 4 and 5, the cam follower 70 is confined in a bore 72 extending radially from the socket 44 through the outer wall 74 of piston body 22. Thus, cam follower 70 is restrained from any but radial translation with respect to piston body 22. Cam follower 70 in response to the radially outwardly directed force exerted by spring 60 upon ball portion 54 with which cam follower 70 is in direct contact rides in camming groove 68. As shown in FIG. 5, camming groove 68 has a profile whereby the depth of the groove toward the end of the piston stroke decreases in the portion 76 which has the effect of forcing the cam follower ball 70 radially inwardly of the bore 72 which in turn forces the ball portion 54 radially inwardly and thus shortens the lever arm 56 through which a portion of the applied force is transmitted to the piston body 22. FIG. 5 shows fragmentary portions of the piston body in two positions, the second position being shown in phantom and illustrating a portion of the stroke of the piston body 22 in an hydraulic fluid-pressurizing direction from right to left.

Figure 6:
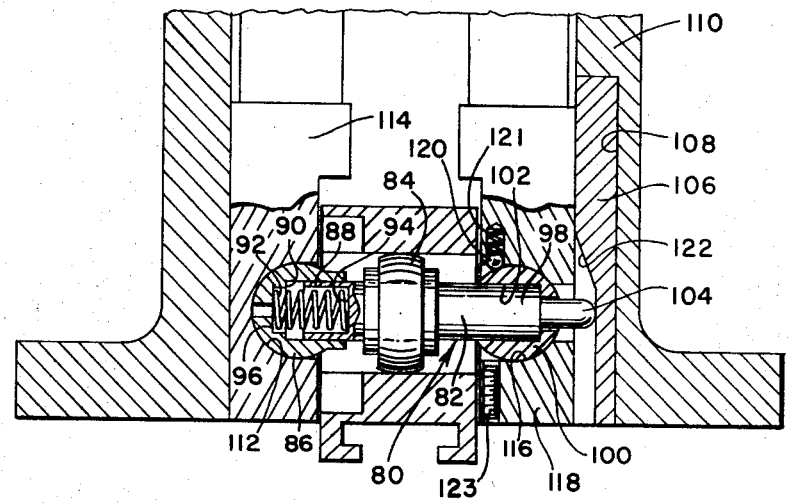
FIG. 6 is a fragmentary cross-sectional view showing another embodiment of the present invention.
Figure 7:
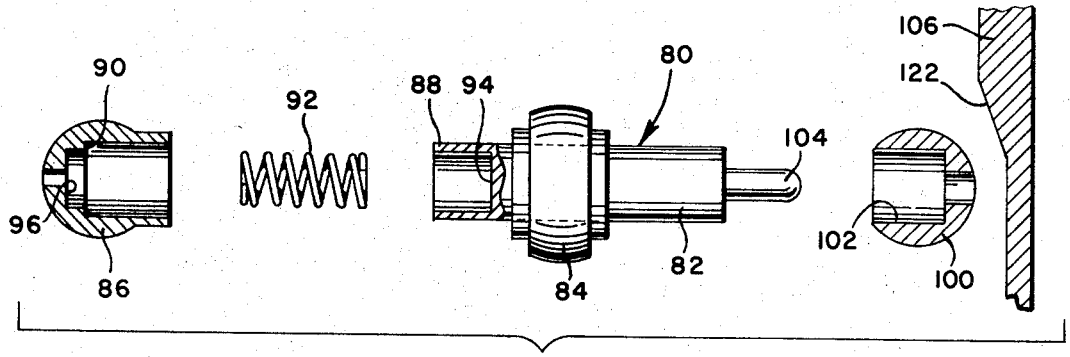
FIG. 7 is an exploded view, partially in cross-section and on an enlarged scale, showing another embodiment of a force-dividing bar or rocking beam cross-member characterized in that both moment arms are changed in length, and showing the structure for effecting such a change in the relative lengths of the moment arms.

A highly satisfactory and preferred mode of carrying out this invention is shown in FIGS. 6 and 7 wherein by displacement of the fulcrum relative to the ball portions, the ratio of the lengths of the moment arms is changed by lengthening one arm and correspondingly shortening the other. In this embodiment the means for changing the ratio of forces includes resilient means coacting between one end of said rocking beam cross member and the ball portion telescopically mounted thereon, and cam following means extending axially from the opposite end of said rocking beam cross member through the other ball portion telescopically mounted on said opposite end and the piston body for coaction with a stationary cam supported adjacent said piston body, and means for retaining said last mentioned ball portion in its piston body socket. Accordingly, there is provided a rocking beam cross member 80 including a bar 82 having press-fitted thereon at a point intermediate its extremities a fulcrum member 84. Each of the ends of the bar 82 is provided with a telescopically movable ball portion. The ball portion 86 coacting with the left end 88 of the bar 82 is constructed and supported in a manner similar to the ball portion 54 as shown in FIG. 3. The ball portion 86 is designed and fitted for telescoping relation with the end 88 of rocking beam cross member 80. To this end, the ball portion 86 is provided with a recess 90 dimensioned to receive the end 88 telescopically. In order to bias the ball portion 86 away from the fulcrum 84, there is provided a small coil spring 92 which is retained in operative condition by means of a counterbore 94 in the end of arm 88, and a counterbore 96 in the ball portion 86. Thus, it will be appreciated with such structure the ball portion 86 is telescopically movable on arm 88 relative to the fulcrum 84.

The right-hand end 98 of the bar 82 is also provided with a ball portion 100 having a recess 102 bored therein and dimensioned to receive the end 98 of the bar 82 telescopically. Extending in an axial direction from the end 98 of the bar 82 and through piston body 118 is a cam follower 104 which may be integral with the bar 82 or suitably affixed thereto. The cam follower 104 is dimensioned for coaction with a cam 106 which is desirably, although not essentially, a separate hardened steel way or cam member fitted in a slot 108 milled into the cylinder housing 110.

The coil spring 92 coacts between the ball portion 86 and the end 88 of bar 82 to bias the ball portion 86 into socket 112 in piston body 114. To retain the ball portion 100 properly seated in its socket 116 in the piston body 118, there is provided a keeper 120 biased by spring 121 between the ball portion 100 and the piston body 118 and engaging the surface of the ball. A simple set screw 123 plugs the drill hole.

The manner of operation of the apparatus shown in FIGS. 6 and 7 is essentially the same as previously described with respect to the device shown in FIGS. 2, 3, 4 and 5. As the cam follower 104 moves along the cam 106, and engages the surface 122, the fulcrum 84 will be displaced to the left as shown in FIG. 6, thereby changing not only the length of arm portion 98 but also and correspondingly the length of arm portion 88, and thus changing the ratio of the lengths of these arms and accordingly the proportion of the force applied through each of them.

As will be appreciated by those skilled in the art, the profile of camming groove 68 represented by the line 78 in FIG. 5 and surface 122 in FIG. 6 may be of any predetermined contour to provide any desired change in the ratio of the pressures applied to the fluids in the respective hydraulic subsystems as the piston bodies 22 and 24 (or 114 and 118) are moved within their respective cylinders. Moreover, although in the embodiment shown in FIGS. 2, 3, 4 and 5 there has been illustrated a single camming groove and telescoping ball portion, it will be appreciated that the opposite extremity of the force-dividing bar 42 (rocking beam cross member 42) may also be provided with a telescoping ball portion, a camming groove and a cam follower. The cam profile in the respective cylinders may now be different and effect even greater changes in the ratio more rapidly, or at different times in the course of a piston stroke. An infinite variety of cam profiles and combinations of cam profiles are thus available to bring about any desired alteration of the ratio of pressures applied to the hydraulic fluids in the respective hydraulic subsystems.

Instead of a ball-shaped cam follower, there may also be employed a disc-type cam follower, or a protuberance from telescoping ball portion 54 and extending through radial bore 72 for communication with a camming groove 68 and cylinder wall 66.

Other equivalent structures for effecting a change in the ratio of hydraulic pressures in respective hydraulic subsystems during a fluid-pressurizing stroke will become readily apparent to those skilled in the art.

There has thus been provided an improved master piston actuator for hydraulic fluid actuated systems, for example hydraulically actuated brakes, whereby proportionating as between pressures applied in separate hydraulic subsystems may be achieved. It is frequently desirable after braking has been initiated for safest and best braking performance, for example, to provide for adjustment of the pressures in the respective front and rear hydraulic brake subsystems. The present invention provides a simple, inexpensive, flexible means for achieving this desired result.

What is claimed is:

1. An hydraulic fluid actuator useful in dual system hydraulically operated brakes comprising in combination:
    (a) a pair of piston bodies movable in fixed separate parallel cylinders in response to an applied force;
    (b) a housing for said cylinders;
    (c) means for transmitting force to said pistons to cause movement thereof including force-dividing means coacting between said pistons to transmit a portion of said applied force to each of said pistons; and
    (d) means coacting between the force dividing means and said housing for changing the ratio of the forces applied to said pistons respectfully during the stroke of said pistons in said cylinders.

2. The combination of claim 1 wherein the piston bodies are in parallel side-by-side relation.

3. The combination of claim 1 wherein the force transmitting means includes a piston actuator movable from a position intermediate said pistons and said force-dividing means coacts therewith.

4. The combination of claim 3 wherein fulcrum means are interposed between said piston actuator and said force-dividing means whereby said piston bodies are differentially movable in said cylinders.

5. The combination of claim 2 wherein the force-transmitting means includes a piston actuator movable along an axis lying in a plane which is parallel to and disposed between the axes of said piston bodies and said force-driving means coacts therewith.

6. The combination of claim 5 wherein fulcrum means are interposed between said piston actuator and said force-dividing means.

7. The combination of claim 2 wherein the force-dividing means is a rocking beam across member pivotally joining said piston bodies.

8. The combination of claim 7 wherein said rocking beam is joined at each of its extremities to a piston body through a ball and socket joint.

9. The combination of claim 7 wherein said rocking beam includes a fulcrum intermediate its extremities.

10. The combination of claim 9 wherein the force-transmitting means also includes a piston actuator movable along an axis lying in a plane which is parallel to and disposed between the axes of said piston bodies, said piston actuator coacting with said rocking beam through said fulcrum to transmit said applied force between said rocking beam and said actuator.

11. The combination of claim 1 wherein the means for changing the ratio of the forces coacts between at least one cylinder and said force-dividing means.

12. In combination:
(a) a pair of piston bodies in parallel, side-by-side relation, movable along fixed parallel axes in separate cylinders, each piston including a socket disposed in opposed relation to the socket in the other piston;
(b) a housing for said cylinders;
(c) a piston actuator movable along an axis lying in a plane which is parallel to and disposed between the axes of said piston bodies and movable in response to an axially directed force or force component applied thereto, said actuator having a transverse opening extending therethrough and being alignable with said sockets;
(d) a rocking beam cross member disposed in said opening and having extremities extending into operative force-transmitting communication with said sockets to divide said axially directed force or force component between said pistons;
(e) fulcrum means coacting between said piston actuator and said rocking beam cross member and intermediate the extremities thereof for transferring an axially applied force or force component between said piston actuator and said rocking beam cross member; and
(f) means coacting between the force-dividing means and said housing for changing the ratio of the forces transmitted between said rocking beam cross member and each of said piston bodies respectively during the stroke of said pistons in said cylinders.

13. The combination of claim 12 wherein the ratio changing means includes means for changing the distance between said fulcrum means and at least one of the extremities of said rocking beam cross member.

14. The combination of claim 12 wherein the ratio changing means includes means for changing the distance between said fulcrum means and both of the extremities of said rocking beam cross member.

15. The combination of claim 12 wherein the extremities of said rocking beam cross member include ball-shaped portions dimensioned for coaction in said sockets.

16. The combination of claim 15 wherein at least one of said ball-shaped portions is movable axially of said rocking beam.

17. The combination of claim 16 including means for biasing said axially movable ball-shaped portion against beam shortening movement.

18. The combination of claim 16 in which the ball-shaped portion includes a recess for telescopically receiving said at least one extremity of said rocking beam cross member.

19. The combination of claim 18 including coil spring biasing the ball portion and the extremity of said rocking beam cross member against compressive telescopic movement.

20. The combination of claim 13 wherein the ratio changing means includes a cam and a cam follower.

21. The combination of claim 20 wherein the cam is a groove in the cylinder contoured in a predetermined profile, and the cam follower is a rolling member disposed between the groove and the extremity of said rocking beam cross member.

22. The combination of claim 21 wherein the cam follower is a ball.

23. The combination of claim 20 in which the cam follower is an extension of the rocking beam cross member.

24. The combination of claim 12 in which the ends of the rocking beam cross member are each provided with ball portions for coaction with said sockets, each ball portion telescopically movable relative to said rocking beam cross member.

25. The combination of claim 24 in which the means for changing the ratio of forces includes resilient means coacting between one end of said rocking beam cross member and the ball portion telescopically mounted thereon, and cam following means extending axially from the opposite end of said rocking beam cross member through the other ball portion telescopically mounted on said opposite end and the piston body for coaction with a stationary cam supported adjacent said piston body, and means for retaining said last mentioned ball portion in its piston body socket.

References Cited

UNITED STATES PATENTS

| | | |
|---|---|---|
| 2,754,938 | 7/1956 | Gallay. |
| 2,953,936 | 9/1960 | Wiley. |
| 2,995,218 | 8/1961 | Penrod _____ 188—152.02 |
| 3,258,298 | 6/1966 | Holland _____ 303—6 |
| 3,278,240 | 10/1966 | Boyd _____ 303—6 |
| 3,360,938 | 1/1968 | Davis. |
| 3,370,426 | 2/1968 | Fay. |
| 3,371,487 | 3/1968 | Stelzer. |
| 3,406,522 | 10/1968 | Fay. |

FOREIGN PATENTS 742,943   1/1956   Great Britain.

MARTIN P. SCHWADRON, Primary Examiner

R. BUNEVICH, Assistant Examiner

U.S. Cl. X.R.

188—152; 303—6